(12) United States Patent
Xiong et al.

(10) Patent No.: US 11,825,402 B2
(45) Date of Patent: *Nov. 21, 2023

(54) NETWORK ARCHITECTURE APPLICABLE TO FLEXIBLE DEPLOYMENT SCENARIO

(71) Applicant: HUAWEI TECHNOLOGIES CO., LTD., Guangdong (CN)

(72) Inventors: Xin Xiong, Shenzhen (CN); Zhenglei Huang, Beijing (CN); Shiyong Tan, Beijing (CN); Bo Lin, Shenzhen (CN); Yanmei Yang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 59 days.

This patent is subject to a terminal disclaimer.

(21) Appl. No.: 17/538,335

(22) Filed: Nov. 30, 2021

(65) Prior Publication Data
US 2022/0095203 A1    Mar. 24, 2022

Related U.S. Application Data

(63) Continuation of application No. 16/399,514, filed on Apr. 30, 2019, now Pat. No. 11,218,947, which is a (Continued)

(30) Foreign Application Priority Data

Nov. 2, 2016 (CN) .......................... 201610959341.0

(51) Int. Cl.
*H04W 48/08* (2009.01)
*H04W 48/02* (2009.01)
(Continued)

(52) U.S. Cl.
CPC ............... *H04W 48/08* (2013.01); *H04L 9/40* (2022.05); *H04W 28/02* (2013.01); *H04W 48/02* (2013.01);
(Continued)

(58) Field of Classification Search
CPC .......... H04L 9/40; H04L 12/66; H04W 28/02; H04W 48/02; H04W 48/08; H04W 76/15; H04W 76/16; H04W 88/12
See application file for complete search history.

(56) References Cited

U.S. PATENT DOCUMENTS 10,484,859 B2   11/2019  Qiao et al.
10,616,120 B2    4/2020  Starsinic et al.
(Continued)

FOREIGN PATENT DOCUMENTS

CN    101232495 A    7/2008
CN    101483850 A    7/2009
(Continued)

OTHER PUBLICATIONS

Xing, "Method and Device for Across-System Interoperation," English Machine Translation of Xing (WO 2014/166112 A1), Clarivate Analytics, pp. 1-20 (Year: 2023).*
(Continued)

*Primary Examiner* — Thomas R Cairns
*Assistant Examiner* — Kai Chang
(74) *Attorney, Agent, or Firm* — WOMBLE BOND DICKINSON (US) LLP

(57) ABSTRACT

The present invention provides a data processing method, a node, a structure, and an apparatus. The method includes: receiving, by an aggregation node, a first non-access stratum message sent by user equipment UE, where the aggregation node includes at least two types of interfaces, and each type of interface is used to receive a first non-access stratum message of one radio access technology RAT type; converting, by the aggregation node, the first non-access stratum message into a non-access stratum message in a first format based on a RAT type of the first non-access stratum message, where the first format is a non-access stratum message
(Continued)

transmission format supported between the aggregation node and a core-network control plane entity; and sending, by the aggregation node, the non-access stratum message in the first format to the core-network control plane entity.

15 Claims, 7 Drawing Sheets

Related U.S. Application Data continuation of application No. PCT/CN2017/108971, filed on Nov. 1, 2017.

(51) Int. Cl.
| | |
|---|---|
| *H04W 28/02* | (2009.01) |
| *H04W 88/12* | (2009.01) |
| *H04W 76/16* | (2018.01) |
| *H04L 9/40* | (2022.01) |
| *H04L 12/66* | (2006.01) |

(52) U.S. Cl.
CPC .......... *H04W 76/16* (2018.02); *H04W 88/12* (2013.01); *H04L 12/66* (2013.01)

(56) References Cited

U.S. PATENT DOCUMENTS

| | | | |
|---|---|---|---|
| 2012/0122517 A1* | 5/2012 | De Jong | H04W 36/14 |
| | | | 455/552.1 |
| 2012/0250601 A1 | 10/2012 | Choi et al. | |
| 2013/0044709 A1 | 2/2013 | Adjakple et al. | |
| 2015/0094073 A1 | 4/2015 | Peng | |
| 2015/0117308 A1 | 4/2015 | Kant | |
| 2015/0215725 A1 | 7/2015 | Xu | |
| 2015/0244618 A1 | 8/2015 | Chakrabarti et al. | |
| 2015/0334597 A1* | 11/2015 | Peisa | H04W 36/0011 |
| | | | 370/235 |
| 2016/0057589 A1* | 2/2016 | Kim | H04W 4/14 |
| | | | 455/466 |
| 2016/0156485 A1 | 6/2016 | Zhang et al. | |
| 2016/0174285 A1 | 6/2016 | Ke et al. | |
| 2016/0183149 A1 | 6/2016 | Stojanovski et al. | |
| 2017/0041218 A1 | 2/2017 | Fan et al. | |
| 2017/0071025 A1* | 3/2017 | Xu | H04W 28/12 |
| 2017/0195930 A1 | 7/2017 | Tomici et al. | |
| 2018/0041934 A1* | 2/2018 | Agarwal | H04W 64/003 |
| 2018/0184297 A1 | 6/2018 | Mohamed et al. | |
| 2018/0220302 A1 | 8/2018 | Chen et al. | |
| 2018/0295659 A1 | 10/2018 | Shan | |
| 2018/0309585 A1 | 10/2018 | Jiang | |
| 2018/0332649 A1* | 11/2018 | Fan | H04W 92/24 |
| 2019/0014530 A1 | 1/2019 | Aghili et al. | |
| 2019/0110170 A1 | 4/2019 | Lu | |
| 2019/0230554 A1* | 7/2019 | Kang | H04W 28/0925 |
| 2020/0092795 A1* | 3/2020 | Raval | H04L 63/101 |
| 2020/0178048 A1 | 6/2020 | Kim et al. | |
| 2021/0092668 A1* | 3/2021 | Zaus | H04W 60/00 |

FOREIGN PATENT DOCUMENTS

| | | | | |
|---|---|---|---|---|
| CN | 102036421 A | 4/2011 | | |
| CN | 102781069 A | 11/2012 | | |
| CN | 103108377 A | 5/2013 | | |
| CN | 103179637 A | 6/2013 | | |
| CN | 103229548 A | 7/2013 | | |
| CN | 103369739 A | 10/2013 | | |
| CN | 103686936 A | 3/2014 | | |
| EP | 2811786 A1 | 12/2014 | | |
| WO | 2014151436 A1 | 9/2014 | | |
| WO | WO-2014166112 A1 * | 10/2014 | ............ | H04W 88/10 |
| WO | 2014183685 A1 | 11/2014 | | |

OTHER PUBLICATIONS

3GPP TR 23. 799 V1 .1.0 (Oct. 2010), 3rd Generation Partnership Project; Technical Specification Group Services and System Aspects; Study on Architecture for Next Generation System(Release 14), 501 pages.

ZTE et al: "3GPP architecture framework proposal for Next Generation Network Architecture with Access Independent Core", 3GPP Draft; S2-161351, vol. SA WG2, No. Sophia Antipolis; Feb. 23, 2016-Feb. 26, 2016, Mar. 3, 2016, XP051086325, 7 pages.

3GPP TS 36.331 V14.0.0 (Sep. 2016), 3rd Generation Partnership Project; Technical Specification Group Radio Access 1 Network; Evolved Universal Terrestrial Radio Access (E-UTRA); Radio Resource Control (RRC); Protocol specification (Release 14), 643 pages.

* cited by examiner

NETWORK ARCHITECTURE APPLICABLE TO FLEXIBLE DEPLOYMENT SCENARIO

CROSS-REFERENCE TO RELATED APPLICATIONS

This application is a continuation of U.S. application Ser. No. 16/399,514, filed on Apr. 30, 2019, which is a continuation of International Application No. PCT/CN2017/108971, filed on Nov. 1, 2017, which claims priority to Chinese Patent Application No. 201610959341.0, filed on Nov. 2, 2016. All of the afore-mentioned patent applications are hereby incorporated by reference in their entireties.

TECHNICAL FIELD

This application relates to the field of communications technologies, and in particular, to a message transmission method and a core network device.

BACKGROUND

Currently, a network architecture of an evolved packet system (evolved packet system, EPS) is a network architecture designed for a mobile broadband (mobile broadband, MBB) service, and is an architecture that meets high throughput requirements and requirements of a large-coverage cellular deployment scenario. This architecture does not impose strict requirements on a latency, reliability, and a user density.

FIG. 1 is a diagram of a network structure of an evolved packet system. In the figure, user equipment UE (user equipment) 101 is mobile user equipment, and can be directly connected to a radio access network RAN (radio access network) by using an air interface and initiate or receive a call. The radio access network processes a function related to radio access. In comparison with a serving general packet radio system GPRS (general packet radio system) support node SGSN (serving GPRS support node) in a 3G technology, in the EPS, a control plane and a user plane are separated: A mobility management entity MME (mobility management entity) 105 is configured to process signaling of the control plane and implement mobility management, including functions such as user context and mobile status management and temporary user identity allocation. A serving gateway SGW (serving gateway) 103 is separately connected to the mobility management entity and the radio access network, to implement a function of the user plane. At a backend, the SGW is connected to a packet data packet data network (PDN) gateway PGW (PDN-Gateway). In FIG. 1, the MME, the SGW, and the PGW are network elements of a core network CN (core network).

A main requirement on a network architecture of a 5G (5th generation) core network is that the network architecture is applicable to flexible deployment in a plurality of scenarios, including support for MBB, massive machine type communication mMTC (massive machine type communication), and ultra-reliability low latency communication URLLC (ultra-Reliability low latency communication) services. Requirements on performance indicators of these types of services are different. URLLC has higher requirements on a latency and reliability than MBB, and mMTC needs to support a larger quantity of users than MMB. An original 4G architecture cannot meet a multi-service support requirement, especially cannot meet special requirements of URLLC on a latency and reliability.

A non-access stratum NAS (non-access stratum) is a functional layer between a core network and user equipment. Generally, an access-stratum procedure is a procedure that requires participation of a radio-access-layer device in processing; and a non-access stratum procedure is a signaling procedure that needs to be processed only by the UE and the CN, and a radio access network essentially does not need to process this procedure. In a scenario with a plurality of radio access technologies RATs (radio access technology), non-access stratum messages of different RAT types all need to be sent to the core network. When a plurality of types of network architectures (for example, an architecture in 2G, 3G, 4G, 5G, or Wireless Fidelity Wi-Fi (Wireless Fidelity)) coexist in addition to the architecture shown in FIG. 1, each network architecture may require an interface connecting to the core network. In this way, the NAS messages of the different RAT types are sent to the core network by using the interfaces, respectively. In such scenario, the core network processes a large amount of data. Especially in a future network environment in which a great quantity of user equipments access a network, automobiles and household and industrial devices access the network, and the Internet of Things is formed, performance design of the core network becomes more complex and difficult, and data transmission stability is also affected.

SUMMARY

Embodiments of the present invention provide a message transmission method and a core network device, used to reduce load of a core network and reduce a path latency.

According to an aspect, the present invention provides a message transmission method. The method includes: receiving, by an aggregation node, a first non-access stratum message sent by user equipment UE; converting, by the aggregation node, the first non-access stratum message into a non-access stratum message in a first format based on a RAT type of the first non-access stratum message, where the first format is a non-access stratum message transmission format supported between the aggregation node and a core-network control plane entity; and sending, by the aggregation node, the non-access stratum message in the first format to the core-network control plane entity.

By using the foregoing method, the aggregation node, instead of a core-network control plane, implements a function of parsing the non-access stratum message based on the RAT type, to reduce a data processing latency. In addition, this solution also enables a network entity on a RAN side or near the RAN side to directly process the non-access stratum message, so that subsequent processing is more flexible and reliable and a response is rapidly given.

In a possible design, the aggregation node includes at least two types of interfaces, and each type of interface is used to receive a first non-access stratum message of one radio access technology RAT type. In another possible design, the aggregation node includes one interface, and the interface can support interconnection and interworking between at least two types of interfaces.

In a possible design, the method further includes: receiving, by the aggregation node, a core-network user plane indication message sent by the UE; and selecting, by the aggregation node, a user plane based on the core-network user plane indication message, where the selecting, by the aggregation node, a user plane based on the core-network user plane indication message includes: setting up, by the aggregation node, a user plane bearer based on the core-network user plane indication information.

In a possible design, the receiving, by the aggregation node, a core-network user plane indication message sent by the UE and the selecting, by the aggregation node, a user plane based on the core-network user plane indication message may be implemented separately.

In another possible design, the aggregation node determines, based on the user plane indication information, that the user plane bearer is a local user plane bearer and/or a remote user plane bearer, where the local user plane bearer and the remote user plane bearer are used to transmit data. In another possible design, the user plane indication information includes a bearer indication, and the bearer indication is used to set up the local user plane bearer and the remote user plane bearer. In this way, the aggregation node can further determine a local service and a remote service, to reduce processing load of a core network; and further set up a local bearer and/or a remote bearer on such a basis, to improve processing efficiency and reduce a latency.

In still another possible design, the method further includes: receiving, by the aggregation node, an initial access response message sent by the core-network control plane entity, where the initial access response message includes core-network user plane keeping information and quality of service QoS (quality of service) information of the UE; and keeping, by the aggregation node, the bearer between the aggregation node and a core-network user plane based on the core-network user plane keeping information and the QoS information of the UE. In a possible design, the aggregation node keeps an RRC connection to the UE based on the core-network user plane keeping information and the QoS information of the UE. As a further implementation solution of the design, the keeping, by the aggregation node, the bearer between the aggregation node and a core-network user plane based on the core-network user plane keeping information and the QoS information of the UE further includes: receiving, by the aggregation node, user-plane data sent by a local user-plane node; and triggering, by the aggregation node, paging based on the user-plane data; and sending, by the aggregation node, a paging message by using a base station in a timing advance TA range of the aggregation node.

In yet another possible design, the keeping, by the aggregation node, the bearer between the aggregation node and a core-network user plane based on the core-network user plane keeping information and the QoS information further includes: receiving, by the aggregation node, user-plane data sent by a local user-plane node; and triggering, by the aggregation node, paging; and sending, by the aggregation node, a paging message by using a base station in a timing advance (timing advance) TA range of the aggregation node. By using the foregoing manner, when the user equipment moves between base stations served by the edge control plane entity, the edge control plane entity can learn of, by using the paging message, a base station to which the user equipment moves, thereby implementing more accurate positioning and control.

By using the foregoing several manners, an interface of the aggregation node and an interface of the core network can be unified, so that the interface of the aggregation node and the interface of the core network no longer need to support receiving and sending of non-access stratum messages of a plurality of RAT types, thereby reducing deployment complexity, saving computing resources of a core network device, and improving overall network efficiency.

According to another aspect, an embodiment of the present invention provides an aggregation node apparatus. The aggregation node device has a function of implementing an action of the aggregation node device in the foregoing method example. The function may be implemented by hardware or may be implemented by hardware executing corresponding software. The hardware or software includes one or more modules corresponding to the foregoing function.

The aggregation node apparatus may further implement corresponding functions in the foregoing method. For example, in a possible design, the aggregation node apparatus includes: a receiving unit, configured to receive a first non-access stratum message sent by user equipment UE; a determining unit, configured to convert the first non-access stratum message into a non-access stratum message in a first format based on a RAT type of the first non-access stratum message, where the first format is a non-access stratum message transmission format supported between the aggregation node and a core-network control plane entity; and a sending unit, configured to send the non-access stratum message in the first format to the core-network control plane entity. The determining unit may be a processor, the sending unit may be a transmitter, and the receiving unit may be a receiver. The sending unit and the receiving unit may be a transceiver antenna. The aggregation node, instead of a core-network control plane, implements a function of parsing the non-access stratum message based on the RAT type, to reduce a data processing latency. In addition, the aggregation node also enables a network entity on a RAN side or near the RAN side to directly process the non-access stratum message, so that subsequent processing is more flexible and reliable and a response is rapidly given.

According to still another aspect, in addition to the aggregation node apparatus, the present invention further provides apparatuses or entities corresponding to several other networking modes, including an edge control plane entity, a second aggregation node entity, and the like. Each entity may implement a function same as or similar to the function implemented by the aggregation node, to improve networking flexibility and reduce a latency.

According to yet another aspect, an embodiment of the present invention provides a computer storage medium, configured to store a computer software instruction used by the foregoing aggregation node device and including a program designed for executing the foregoing aspects.

According to still yet another aspect, an embodiment of the present invention further provides a communications system. The system includes the aggregation node device in the foregoing aspects, user equipment UE, an access node device, a core-network control plane node device, a core-network user plane node device, and an interface and a link in between. The aggregation node receives, by using a first link and a second link, a non-access stratum message that is of a first radio access technology RAT type and that is sent by the user equipment; the aggregation node receives, by using the first link and a third link, a non-access stratum message that is of a second RAT type and that is sent by the user equipment; the aggregation node converts the non-access stratum message of the first RAT type into a first non-access stratum message; the aggregation node converts the non-access stratum message of the second RAT type into a second non-access stratum message, where RAT types of the first non-access stratum message and the second non-access stratum message are the first RAT type; and the aggregation node sends the first non-access stratum message and the second non-access stratum message to the core-network control plane node by using a fourth link; or the aggregation node sends the first non-access stratum message and the second non-access stratum message to the core-network control plane node by using a fifth link. The system is capable of implementing various methods in the present invention, to meet low-latency and reliability requirements and meet future requirements imposed by a significant increase of a density of user equipment.

DESCRIPTION OF EMBODIMENTS

Figure 1:
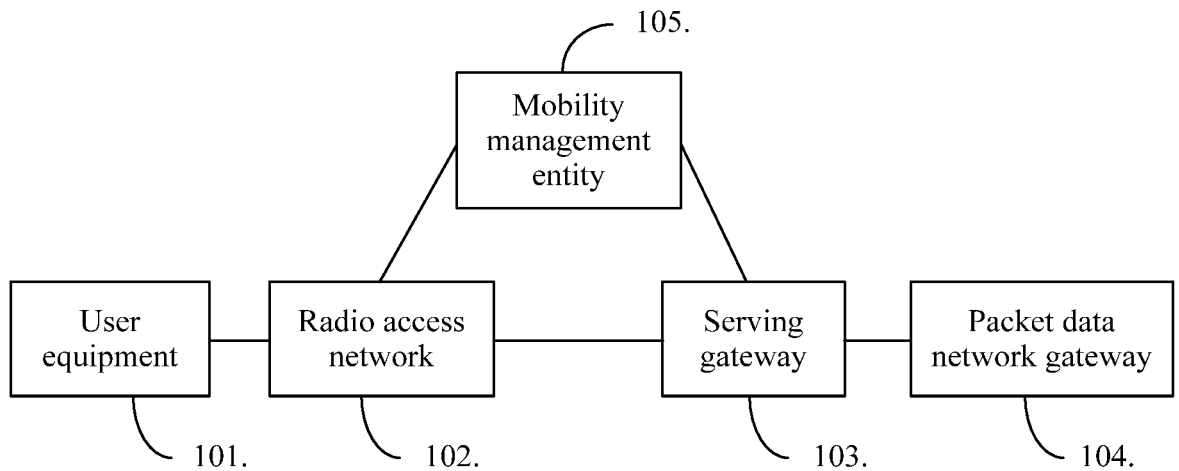
FIG. 1 is a schematic diagram of a 4G network architecture in the prior art.

To make the objectives, technical solutions, and advantages of the present invention clearer, the following describes the technical solutions of the embodiments of the present invention with reference to the accompanying drawings.

To meet latency and reliability requirements and a multi-user requirement, in an existing network architecture, user equipment sends initial access requests of different standards. After the initial access requests are sent to a core network CN (core network) through a radio access network RAN (radio access network), a core network control plane (control plane) parses the initial access requests of different standards. The initial access requests of different standards may be differentiated by using different RAT types, and an initial access request may be a non-access stratum message. In this process, the RAN receives the initial access requests of different standards from the user equipment in a transparent transmission manner, and forwards the initial access requests to the core network. After the core network completes processing the initial access requests, the core network then returns an access request response. With settings of the foregoing network architecture, data processing load of the core network is increased, and a network latency is also increased. Especially in a multi-user scenario, this technical problem is further magnified. Therefore, the network architecture needs to be more complete, so that a data service can be flexible, reliable, and rapidly responded.

The embodiments of the present invention provide a message transmission method and an apparatus that is based on the method, for example, a core network interface device, to reduce complexity of communication and interaction between a core network and each external entity. The method and the apparatus of the present invention are based on a same inventive concept. Principles by which the method and the apparatus resolve a problem are similar. Therefore, embodiments of the apparatus and the method may be cross-referenced. Same content is not described repeatedly.

A technical solution of the embodiments of the present invention includes a network architecture. The network architecture includes an aggregation node. The aggregation node receives a first non-access stratum message sent by user equipment. In an embodiment, the aggregation node includes at least two types of interfaces, and each type of interface is used to receive a first non-access stratum message of one RAT type. The aggregation node converts the first non-access stratum message into a non-access stratum message in a first format based on a RAT type of the first non-access stratum message, where the first format is a non-access stratum message transmission format supported between the aggregation node and a core-network control plane entity. The support may be interconnection and interworking implemented between the aggregation node and the core-network control plane entity. The aggregation node sends the non-access stratum message in the first format to the core-network control plane entity. In this way, the aggregation node, instead of a core-network control plane, implements a function of parsing the non-access stratum message based on the RAT type, to reduce a data processing latency. In addition, this solution also enables a network entity on a RAN side or near the RAN side to directly process the non-access stratum message, so that subsequent processing is more flexible and reliable and a response is rapidly given.

To describe the technical solutions of the embodiments of the present invention more clearly, the following describes, with reference to accompanying drawings, a service scenario and a system architecture that may be applied to the embodiments of the present invention.

Figure 2:
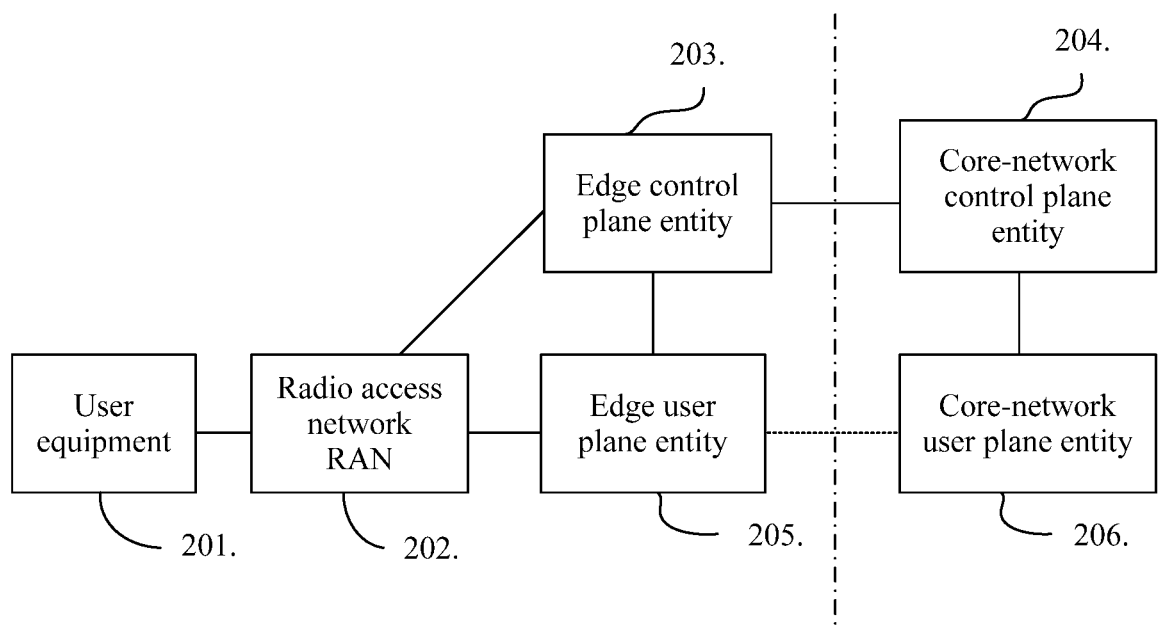
FIG. 2 is a schematic architectural diagram of a possible application scenario according to an embodiment of the present invention.

FIG. 2 shows a possible application scenario and architecture according to an embodiment of the present invention. The architecture includes user equipment 201, a radio access network 202, and four network entities: an edge control plane entity 203, a core-network control plane entity 204, an edge user plane entity 205, and a core-network user plane entity 206. The edge control plane entity 203 is connected to the radio access network 202 and is connected to the core-network control plane entity 204. The edge control plane entity 203 and the core-network control plane entity 204 mainly provide a control function, and the edge user plane entity 205 and the core-network user plane entity 206 mainly provide a service processing function. It should be understood that the foregoing division may be changed. The service processing and control may be implemented in data or signaling exchange between the foregoing entities based on a specific situation. For example, the edge control plane entity 203 may process some specific data packets, and the edge user plane entity 205 may process specific control signaling.

Figure 3:
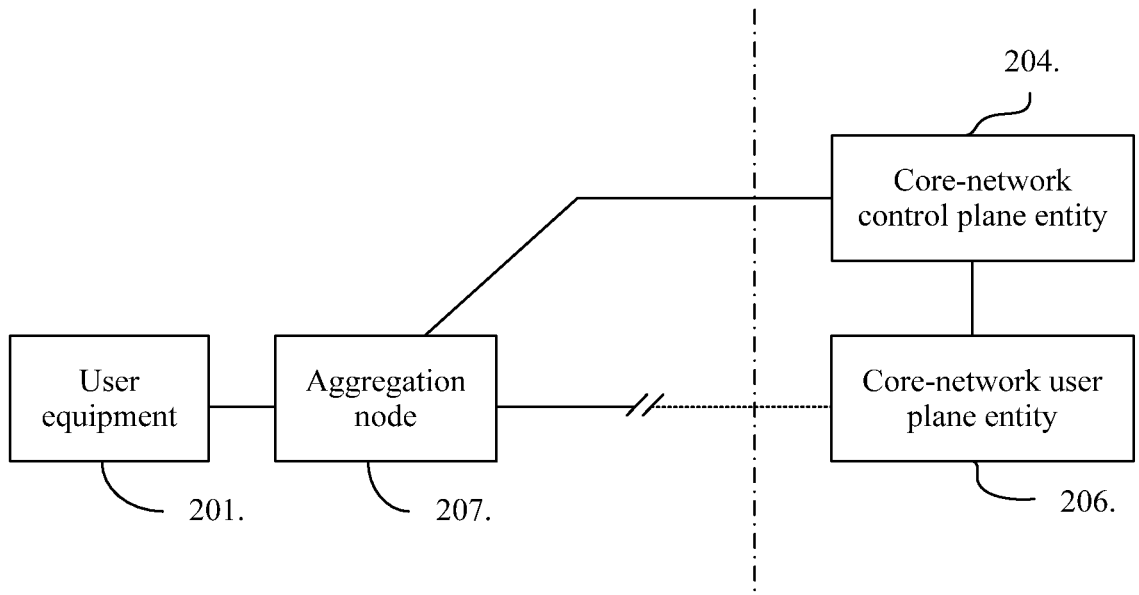
FIG. 3 is a schematic architectural diagram of another possible application scenario according to an embodiment of the present invention.

It should be understood that the edge control plane entity and the edge user plane entity may be specific apparatuses or may be function modules that are integrated into another apparatus and that implement some functions, as shown in FIG. 3. FIG. 3 is different from FIG. 2 in that the edge control plane entity 203 in FIG. 2 may be integrated into the radio access network 202 as an aggregation node device 207. In an embodiment, the aggregation node serves a base station, and the base station is connected to the user equipment 201 by using an air interface. When a latency is considered, if a low latency is required, the edge user plane entity 205 may be disposed independently, or may be integrated into the aggregation node 207. This is not illustrated in the figure.

The entities in FIG. 2 or FIG. 3 may be deployed in different specific manners. Generally, the radio access network 202, the edge control plane entity 203, and the edge user plane entity 205 in FIG. 2 or the aggregation node 207 in FIG. 3 may be deployed in an area near the user equipment 201, and the core-network control plane entity 204 and/or the core-network user plane entity may be deployed at a location near a public data network (Public Data Network, PDN). Generally, deployment is divided based on a geographical location and an administrative region, and may be adjusted accordingly in different countries and cities as required. For example, in a scenario in which a plurality of district-level units constitute a municipal unit, and a plurality of municipal units constitute a provincial unit, in FIG. 2, the edge control plane entity 203 is deployed at a center of a district-level unit, the edge user plane entity 205 is deployed at a center of a municipal unit or a district-level unit, and the core-network control plane entity 204 and the core-network user plane entity 206 are deployed at a center of a provincial unit. In this way, the edge control plane entity is closer to the user equipment and a radio access network device. In FIG. 3, the aggregation node 207 is deployed at a center of a district-level unit, the core-network control plane entity 204 and the core-network user plane entity 206 are deployed at a center of a provincial unit, and the edge user plane entity may be integrated with the aggregation node 207 and deployed in the center of the district-level unit, or may be deployed in a center of a municipal unit. In this way, the edge control plane entity is closer to the user equipment and a radio access network device.

The following describes specific implementations based on FIG. 2.

In an embodiment, according to FIG. 2, the edge control plane entity 203 receives a first non-access stratum message sent by the user equipment UE. In each embodiment, the first non-access stratum message corresponds to one RAT type, for example, 2G, 3G, 4G, 5G, or Wi-Fi. As a network continuously evolves, a RAT may be of another type or form. Non-access stratum messages of different RAT types are non-access stratum message of different standards. The edge control plane entity 203 includes at least two types of interfaces, and each type of interface is used to receive a first non-access stratum message of one RAT type. The edge control plane entity 203 converts the first non-access stratum message into a non-access stratum message in a first format, where the first format is a non-access stratum message transmission format supported between the aggregation node and the core-network control plane entity. The aggregation node sends the non-access stratum message in the first format to the core-network control plane entity. It should be understood that, in the embodiments, conversion may be a decoding process, and more specifically, may be decoding a message to obtain a RAT type feature indication. The indication may be a specific field or may be an implicit identifier of the RAT type. Further, the message may be converted into another non-access stratum message format by changing a RAT feature indication, and a format obtained after the conversion is completed is a format supported by an entity or supported by an entity and a core network. The edge control plane entity 203 may convert the first non-access stratum message into a format of a uniform RAT type, where the format may also be a new format.

In the foregoing embodiment, after receiving the non-access stratum message of one RAT type, the edge control plane entity 203 directly converts the first non-access stratum message into the non-access stratum message in the first format and sends the non-access stratum message to the core network. The core network no longer needs to obtain, by parsing the non-access stratum message obtained through conversion, the RAT type of the non-access stratum message, thereby saving computing resources of the core network and improving overall network efficiency. Further, when converting the first non-access stratum message into the non-access stratum message in the first format, the edge control plane entity 203 may directly parse the first non-access stratum message, and then perform conversion. Therefore, the edge control plane entity may further use the non-access stratum message in the first format obtained through parsing or conversion, increasing service flexibility.

In another embodiment, according to FIG. 2, the edge control plane entity 203 receives at least two first non-access stratum messages sent by the user equipment. At least two of the at least two first non-access stratum messages correspond to different RAT types. There may be one user equipment 201, for example, one user equipment that supports transmission of non-access stratum messages of a plurality of RATs, or there may be a plurality of user equipments that support non-access stratum messages of different RAT types. The edge control plane entity 203 may have different interfaces, to support receiving access stratum messages of different RAT types. In a scenario, a link between an air interface of a base station and an air interface of the user equipment may be used to receive the access stratum messages of different RAT types. After receiving the messages of different RAT types, the base station may directly send the access stratum messages of different RAT types to the edge control plane entity 203 by using a RAN to which the base station belongs. In another scenario, an air interface between a base station and the user equipment does not support non-access stratum messages of a plurality of different RAT types. The non-access stratum messages of different RAT types may be received by different base stations, and then the non-access stratum messages of different RAT types are sent to the edge control plane entity 203 by using a RAN. It should be noted that, from a perspective of implementation, in the embodiments, different interfaces may be a same physical interface and all support receiving non-access stratum messages of different RAT types, because a physical interface of the edge control plane entity 203 may have two or more logical functions, that is, may receive non-access stratum messages of two or more RAT types. The edge control plane entity 203 converts the first non-access stratum messages into non-access stratum messages in a first format based on the respective RAT types of the at least two first non-access stratum messages. The first format is a non-access stratum message transmission format supported between the aggregation node and the core-network control plane entity.

In the foregoing embodiment, after the edge control plane entity 203 receives the at least two non-access stratum messages of different RAT types, the edge control plane entity 203 converts the first non-access stratum messages into the non-access stratum messages in the first format based on the respective RAT types of the at least two first non-access stratum messages. In a process of processing first non-access stratum messages of a plurality of RAT types, the edge control plane entity 203 converts the different first non-access stratum messages into non-access stratum messages of a first type. An interface of the edge control plane entity and an interface of the core network are unified, so that the interface of the edge control plane entity 203 and the interface of the core network no longer need to support receiving and sending of non-access stratum messages of a plurality of RAT types, thereby further reducing deployment complexity, saving computing resources of a core network device, and improving overall network efficiency.

In the architecture in FIG. 2, the edge control plane entity 203 may further implement a function of setting up a user plane bearer. The edge control plane entity 203 receives a core-network user plane indication message sent by the user equipment, and the aggregation node selects a user plane based on the core-network user plane indication message. The user plane bearer is mainly used to transmit data.

In an embodiment, the edge control plane entity 203 determines, based on the user plane indication information, to set up a user plane bearer locally. Then, the edge control plane entity 203 sends local user plane bearer indication information to the edge user plane entity based on the core-network user plane indication information, to further set up the local user plane bearer. That the control plane entity determines, based on the user plane indication information, to set up a user plane bearer locally may be determining performed based on a target IP address or other information included in the user plane indication information. The local user plane bearer may be set up by using the edge control plane entity 203 and the edge user plane entity 205. After the local user plane bearer is set up, different user equipments controlled by the same edge control plane entity can perform communication locally. A length of a path for performing data exchange through the local bearer by the different user equipments controlled by the same edge control plane entity is less than a length of a path for exchanging data by the user equipments through the core network. In a massive machine type communication scenario, communication between local machine-type user equipments may be set up directly by using the local user plane bearer. As a quantity of local machine-type user equipments keeps increasing, setup of the local user plane bearer can greatly reduce conventional processing and computing load of the core network and reduce a latency.

In another embodiment, the edge control plane entity 203 determines, based on the user plane indication information, to set up a core-network user plane bearer on the core-network user plane entity. For example, when the first non-access stratum message is an initial access request message, the edge control plane entity 203 converts a RAT type of the initial access request message and sends the initial access request message to the core-network control plane entity 204. The edge control plane entity 203 receives an initial access response message sent by the core-network control plane entity 204, where the initial access response message includes core-network user plane keeping information and QoS information of the user equipment. The edge control plane entity 203 keeps the bearer between the aggregation node and the core-network user plane based on the core-network user plane keeping information and the QoS information of the user equipment. It should be understood that the first non-access stratum message may not necessarily be an initial access request message, and may be directly triggered by the edge control plane entity 203 or triggered by receiving another first non-access stratum message.

The edge control plane entity 203 may further be used to position the user equipment. In another embodiment, the edge control plane entity 203 receives user-plane data sent by the edge user plane entity 205. The edge control plane entity 203 triggers paging based on the user-plane data. Specifically, this may further include the following: A base station in a TA range that can be supported by the edge control plane entity 203 is used to send a paging message. In this way, the edge control plane entity 203 may send the paging message locally. When the user equipment moves between base stations served by the edge control plane entity, the edge control plane entity can learn of, by using the paging message, a base station to which the user equipment moves, thereby implementing more accurate positioning and control.

The following describes specific implementations based on FIG. 3.

Based on the architecture in FIG. 3, the aggregation node may be an enhanced RAN that integrates an edge control plane entity. The integration may be physical hardware integration. To be specific, enhanced service function board hardware is directly deployed. Alternatively, the integration may be implemented by adding a processing module or a processor, or directly implemented in a processor or a processing module of a RAN entity by using software.

In an embodiment, the aggregation node 207 receives a first non-access stratum message sent by the user equipment 201. The aggregation node 207 includes an air interface, and the air interface is used to receive the first non-access stratum message. The aggregation node converts the first non-access stratum message into a non-access stratum message in a first format based on a RAT type of the first non-access stratum message, where the first format is a non-access stratum message transmission format supported between the aggregation node and the core-network control plane entity. The aggregation node sends the non-access stratum message in the first format to the core-network control plane entity.

In another embodiment, the aggregation node 207 receives a first non-access stratum message sent by the user equipment 201. The aggregation node includes at least two types of interfaces, and each type of interface is used to receive a first non-access stratum message of one RAT type. Optionally, the two types of interfaces are air interfaces. The aggregation node 207 converts the first non-access stratum messages into non-access stratum messages in a first format based on RAT types of the first non-access stratum messages, where the first format is a non-access stratum message transmission format supported between the aggregation node and the core-network control plane entity. The aggregation node sends the non-access stratum messages in the first format to the core-network control plane entity.

In the foregoing embodiment, after receiving the non-access stratum message of one RAT type, the aggregation node 207 directly converts the first non-access stratum message into the non-access stratum message in the first format and sends the non-access stratum message to a core network. The core network no longer needs to obtain, by parsing the non-access stratum message obtained through conversion, the RAT type of the non-access stratum message, thereby saving computing resources of the core network and improving overall network efficiency. Further, when converting the first non-access stratum message into the non-access stratum message in the first format, the aggregation node 207 may directly parse the first non-access stratum message, and then perform conversion. Therefore, the edge control plane entity may further use the non-access stratum message in the first format obtained through parsing or conversion, increasing service flexibility.

In still another embodiment, the aggregation node 207 receives at least two first non-access stratum messages sent by the user equipment 201. At least two of the at least two first non-access stratum messages have different RAT types. The aggregation node includes at least two types of interfaces, and each type of interface is used to receive a first non-access stratum message of one RAT type. There may be one user equipment 201, for example, one user equipment that supports transmission of non-access stratum messages of a plurality of RATs, or there may be a plurality of user equipments that support non-access stratum messages of different RAT types. The aggregation node 207 converts the received first non-access stratum messages into non-access stratum messages in a first format based on RAT types of the first non-access stratum messages, where the first format is a non-access stratum message transmission format supported between the aggregation node 207 and the core-network control plane entity. The aggregation node 207 sends the non-access stratum messages in the first format to the core-network control plane entity.

In the foregoing embodiment, after the aggregation node 207 receives the at least two non-access stratum messages of different RAT types, the aggregation node 207 converts the first non-access stratum messages into the non-access stratum messages in the first format based on the respective RAT types of the at least two first non-access stratum messages. In a process of processing first non-access stratum messages of a plurality of RAT types, the aggregation node 207 converts the different first non-access stratum messages into non-access stratum messages of a first type. An interface of the aggregation node 207 and an interface of the core network are unified, so that the interface of the aggregation node 207 and the interface of the core network no longer need to support receiving and sending of non-access stratum messages of a plurality of RAT types, thereby further reducing deployment complexity, saving computing resources of a core network device, and improving overall network efficiency.

In the architecture in FIG. 3, the aggregation node 207 may also implement a function of setting up a user plane bearer. The aggregation node 207 receives a core-network user plane indication message sent by the user equipment, and the aggregation node selects a user plane based on the core-network user plane indication message. The user plane bearer is mainly used to transmit data. The aggregation node 207 determines, based on the user plane indication information, to set up a user plane bearer locally. That the aggregation node 207 determines, based on the user plane indication information, to set up a user plane bearer locally may be determining performed based on a target IP address, a service type identifier, a radio network temporary identifier RNTI (radio network temporary identifier), or other information included in the user plane indication information. In another embodiment, the aggregation node 207 determines, based on the user plane indication information, to set up a user plane bearer on the core-network user plane entity.

In another embodiment, the aggregation node 207 determines, based on the user plane indication information, to set up a core-network user plane bearer on the core-network user plane entity. Specifically, when the first non-access stratum message is an initial access request message, the aggregation node 207 converts a RAT type of the initial access request message and sends the initial access request message to the core-network control plane entity 204. The aggregation node 207 receives an initial access response message sent by the core-network control plane entity 204, where the initial access response message includes core-network user plane keeping information and QoS information of the user equipment. The aggregation node 207 keeps the bearer between the aggregation node and the core-network user plane based on the core-network user plane keeping information and the QoS information of the user equipment.

The aggregation node 207 may further be used to position the user equipment. In another embodiment, the aggregation node 207 receives user-plane data sent by an edge user plane entity (not shown in the figure). The edge user plane entity may also be a local user-plane node. The aggregation node 207 triggers the edge user plane entity to deliver paging. This specifically includes the following: A base station in a timing advance TA range that can be supported by the aggregation node 207 is used to send a paging message. In this way, the aggregation node 207 may send the paging message locally. When the user equipment moves between base stations served by the aggregation node 207, the aggregation node 207 can learn of, by using the paging message, a base station to which the user equipment moves, thereby implementing more accurate positioning and control.

Figure 4:
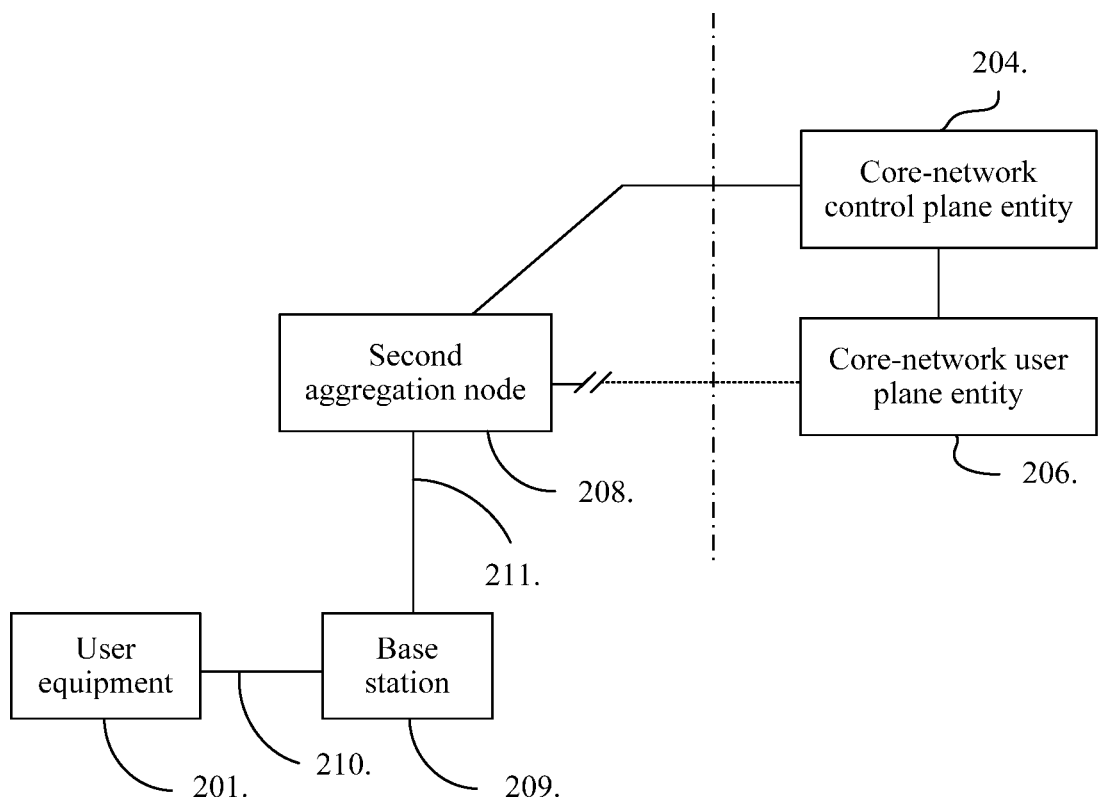
FIG. 4 is a schematic architectural diagram of still another possible application scenario according to an embodiment of the present invention.

FIG. 4 shows another possible application scenario of the present invention. In the figure, a function of a core-network control plane entity 204 and a function of a core-network user plane entity 206 are similar to those in FIG. 2 and FIG. 3. Details are not described herein again. A second aggregation node 208 serves a base station. The second aggregation node 208 receives a first non-access stratum message sent by user equipment. The first non-access stratum message is constituted by a first link 210 and a second link 211. The first link is a link that is between the user equipment and the base station and that includes an air interface, and the second link is a link 211 including an interface between the base station and the second aggregation node. It should be understood that there may be a plurality of interfaces between the second aggregation node 208 and the base station 209, or one interface supports a plurality of types and constitutes different links together with the base station 209. There may also be a plurality of base stations 209, and different base stations 209 may constitute different links together with the second aggregation node 208.

According to FIG. 4, in an embodiment, the second aggregation node 208 receives a first non-access stratum message sent by the base station, where the first non-access stratum message is sent to the base station 209 by the user equipment. The second aggregation node 208 converts the first non-access stratum message into a non-access stratum message in a first format based on a RAT type of the first non-access stratum message, where the first format is a non-access stratum message transmission format supported between the aggregation node and the core-network control plane entity. Optionally, the second aggregation node 208 includes at least two types of interfaces. It should be understood that in the embodiments, at least two types of interfaces included by an entity or a node may be one interface that supports two or more RAT types or two interfaces that each support receiving of one RAT type. The aggregation node sends the non-access stratum message in the first format to the core-network control plane entity. In this way, a core network no longer needs to obtain, by parsing the non-access stratum message obtained through conversion, the RAT type of the non-access stratum message, thereby saving computing resources of the core network and improving overall network efficiency.

In another embodiment according to FIG. 4, the second aggregation node 208 receives at least two first non-access stratum messages sent by the base station 209. At least two of the at least two first non-access stratum messages correspond to different RAT types. The first non-access stratum messages are sent to the base station 209 by the user equipment 201. There may be one user equipment 201, for example, one user equipment that supports transmission of non-access stratum messages of a plurality of RATs, or there may be a plurality of user equipments that support non-access stratum messages of different RAT types. There may also be one or more base stations 209. When there is one base station 209, the base station 209 may support receiving and sending of first non-access stratum messages of a plurality of RAT types. The second aggregation node 208 converts the received first non-access stratum messages into non-access stratum messages in a first format based on RAT types of the at least two first non-access stratum messages, where the first format is a non-access stratum message transmission format supported between the second aggregation node 208 and the core-network control plane entity. The second aggregation node 208 sends the non-access stratum messages in the first format to the core-network control plane entity. In a process of processing a plurality of first non-access stratum messages of a plurality of RAT types, the second aggregation node 208 converts the different first non-access stratum messages into non-access stratum messages of a first type. An interface of the second aggregation node 208 and an interface of the core network are unified, so that the interface of the second aggregation node 208 and the interface of the core network no longer need to support receiving and sending of non-access stratum messages of a plurality of RAT types, thereby further reducing deployment complexity, saving computing resources of a core network device, and improving overall network efficiency.

Similar to FIG. 2 and FIG. 3, the second aggregation node 208 may also implement a function of setting up a user plane bearer. The second aggregation node 208 receives a core-network user plane indication message sent by the user equipment, and the second aggregation node 208 selects a user plane based on the core-network user plane indication message. The user plane bearer is mainly used to transmit data. The second aggregation node 208 determines, based on the user plane indication information, to set up a user plane bearer locally. Specifically, the second aggregation node 208 may perform determining based on a target IP address or other information included in the user plane indication information. In another embodiment, the second aggregation node 208 determines, based on the user plane indication information, to set up a user plane bearer on the core-network user plane entity.

After the local user plane bearer is set up, different user equipments controlled by the same second aggregation node 208 can perform communication locally. A length of a path for exchanging data by the user equipments is less than a length of a path for exchanging data through the core network. In a massive machine type communication scenario, communication between local machines may be set up directly by using the local user plane bearer. As a quantity of such user equipments keeps increasing, setup of the local user plane bearer can greatly reduce conventional processing and computing load of the core network and reduce a latency.

In another embodiment, the second aggregation node 208 determines, based on the user plane indication information, to set up a core-network user plane bearer on the core-network user plane entity. Specifically, when the first non-access stratum message is an initial access request message, the second aggregation node 208 converts a RAT type of the initial access request message and sends the initial access request message to the core-network control plane entity 204. The second aggregation node 208 receives an initial access response message sent by the core-network control plane entity 204, where the initial access response message includes core-network user plane keeping information and QoS information of the user equipment. An edge user plane entity (not shown in the figure) keeps an RRC connection to the user equipment based on the core-network user plane keeping information and the QoS information of the user equipment. The second aggregation node 208 keeps the bearer between the aggregation node and the core-network user plane based on the core-network user plane keeping information and the QoS information of the user equipment.

The second aggregation node 208 may further be used to position the user equipment. In another embodiment, the second aggregation node 208 receives user-plane data sent by the edge user plane entity. The second aggregation node 208 triggers the edge user plane entity to deliver paging. This specifically includes the following: A base station in a TA range that can be supported by the second aggregation node 208 is used to send a paging message. In this way, the second aggregation node 208 may send the paging message locally. When the user equipment moves between base stations served by the second aggregation node 208, the second aggregation node 208 can learn of, by using the paging message, a base station to which the user equipment moves, thereby implementing more accurate positioning and control.

Figure 5:
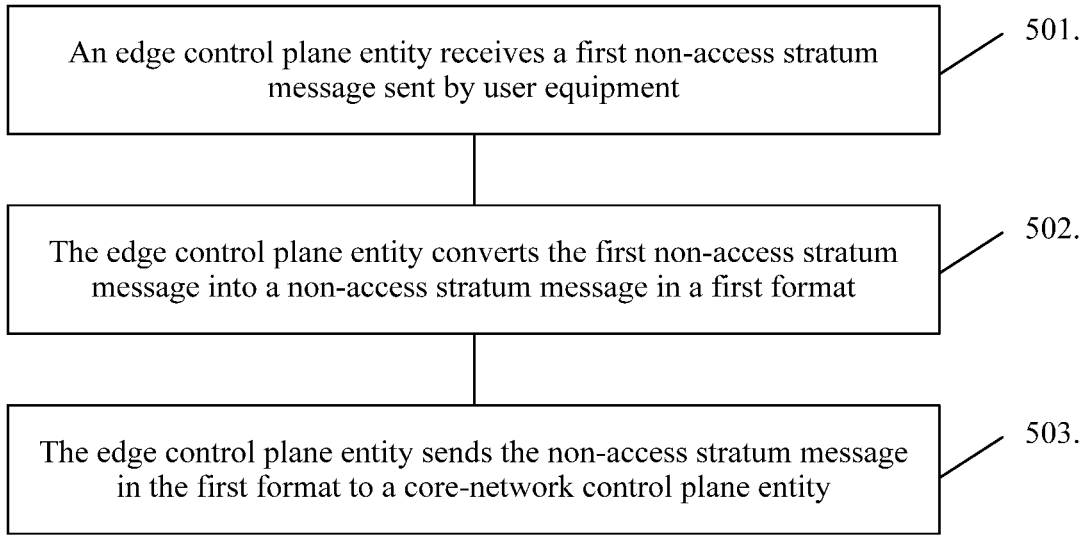
FIG. 5 is a schematic flowchart of a message transmission method according to an embodiment of the present invention.

FIG. 5 is a flowchart of a method according to an embodiment of the present invention. As shown in FIG. 5, a specific procedure of the method includes the following steps.

501: An edge control plane entity receives a first non-access stratum message sent by user equipment UE.

In an example, the edge control plane entity may be the edge control plane entity in FIG. 2.

The first non-access stratum message corresponds to one RAT type, for example, 2G, 3G, 4G, 5G, or Wi-Fi. As a network continuously evolves, a RAT may be of another type or form.

502: The edge control plane entity converts the first non-access stratum message into a non-access stratum message in a first format, where the first format is a non-access stratum message transmission format supported between an aggregation node and a core-network control plane entity.

503: The edge control plane entity sends the non-access stratum message in the first format to the core-network control plane entity.

It should be understood that, during specific implementation, in a specific time period, a specific link, or a specific implementation process, there may be one or more first non-access stratum entities. The following separately describes a case in which there is one first non-access stratum entity and a case in which there are a plurality of first non-access stratum entities.

In an embodiment, step 501 may be specifically as follows: the edge control plane entity receives one non-access stratum message sent by the user equipment. In step 502, the edge control plane entity converts the first non-access stratum message into a non-access stratum message in the first format.

In another embodiment, step 501 may be specifically as follows: the edge control plane entity receives at least two non-access stratum messages sent by the user equipment. The at least two non-access stratum messages have different RAT types. Then, in step 502, the edge control plane entity converts the plurality of first non-access stratum messages into non-access stratum messages in the first format. For example, in step 501, the edge control plane entity receives four first non-access stratum messages: A, B, C, and D. A and B are non-access stratum messages whose RAT types are 3G, C is a non-access stratum message whose RAT type is 4G, and D is a non-access stratum message whose RAT type is 5G. When A, B, C, and D are non-access stratum messages of a same type, refer to the case above in which there is one non-access stratum message in the foregoing embodiments. In step 502, if the edge control plane entity determines that the first format is a transmission format whose RAT type is 5G, the edge control plane entity converts A and B into non-access stratum messages whose RAT types are 5G, the edge control plane entity converts C into a non-access stratum message whose RAT type is 5G, and the edge control plane entity determines that the RAT type of D is already 5G and that D may not be converted. Still using the foregoing four non-access stratum messages A, B, C, and D as an example, when the edge control plane entity determines that the first format is another uniform format and the format is not a 3G, 4G, or 5G transmission format, the edge control plane entity may decode A, B, C, and D based on the RAT types; convert A, B, C, and D into the first format that is different from the RAT types of the received non-access stratum messages; and perform step 503.

It should be understood that, in step 501, a specific receiving manner of the user equipment is not limited when the edge control plane entity receives the first non-access stratum message sent by the user equipment UE, provided that the first non-access stratum message can be received. When there are a plurality of first non-access stratum messages, the first non-access stratum messages may be received in different manners. For example, one interface directly receives the plurality of first non-access stratum messages, or a plurality of interfaces receive the plurality of first non-access stratum messages. In an embodiment, the edge control plane entity includes at least two types of interfaces, and each type of interface is used to receive a first non-access stratum message of one RAT type. In another embodiment, the edge control plane entity includes one interface, and the one interface can support receiving first non-access stratum messages of at least two RAT types.

In the foregoing embodiment, after the edge control plane entity receives the at least two non-access stratum messages of different RAT types, the edge control plane entity converts the first non-access stratum messages into the non-access stratum messages in the first format based on the respective RAT types of the at least two first non-access stratum messages. In a process of processing first non-access stratum messages of a plurality of RAT types, the edge control plane entity converts the different first non-access stratum messages into non-access stratum messages of a first type. An interface of the edge control plane entity and an interface of a core network are unified, so that the interface of the edge control plane entity and the interface of the core network no longer need to support receiving and sending of non-access stratum messages of a plurality of RAT types, thereby further reducing deployment complexity, saving computing resources of a core network device, and improving overall network efficiency.

Figure 6:
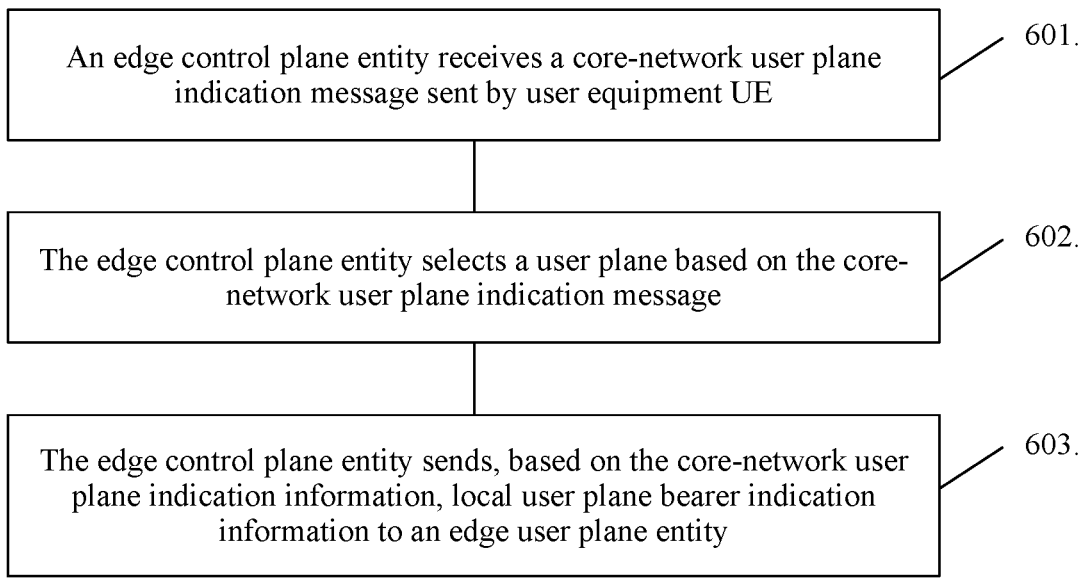
FIG. 6 is a schematic flowchart of a message transmission method according to an embodiment of the present invention.

FIG. 6 further shows another embodiment of the present invention. FIG. 6 may be implemented independently as an embodiment, or may be implemented in combination with the embodiment in FIG. 5.

Step 601: An edge control plane entity receives a core-network user plane indication message sent by user equipment UE.

Step 602: The edge control plane entity selects a user plane based on the core-network user plane indication message, where that the aggregation node selects a user plane based on the core-network user plane indication message includes: setting up a user plane bearer based on the core-network user plane indication information, where the user plane bearer includes a local user plane bearer and/or a remote user plane bearer, and the local user plane bearer and the remote user plane bearer are used to transmit data.

In an embodiment, when the user plane bearer to be set up by the edge control plane entity is a local user plane bearer, step 603 is further included: The edge control plane entity sends, based on the core-network user plane indication information, local user plane bearer indication information to an edge user plane entity, to further set up the local user plane bearer.

The local user plane bearer can be set up by using the edge control plane entity. After the local user plane bearer is set up, different user equipments controlled by the edge control plane entity can perform communication locally. A length of a path for exchanging data by the user equipments is less than a length of a path for exchanging data through a core network. In a massive machine type communication scenario, communication between local machines may be set up directly by using the local user plane bearer. As a quantity of such user equipments keeps increasing, setup of the local user plane bearer can greatly reduce conventional processing and computing load of the core network and reduce a latency.

In another embodiment, when the user plane bearer to be set up by the edge control plane entity is a core-network user plane bearer, step 602 further includes step 604: The edge control plane entity sets up a core-network user plane bearer on a core-network user plane entity based on the user plane indication information. Details are as follows.

Step 605: The edge control plane entity sends an initial access request message to a core-network control plane entity.

Step 606: The edge control plane entity receives an initial access response message sent by the core-network control plane entity, where the initial access response message includes core-network user plane keeping information and QoS information of the user equipment.

Step 607: The edge control plane entity keeps the bearer between the aggregation node and the core-network user plane based on the core-network user plane keeping information and the QoS information of the user equipment.

The edge control plane entity may further be used to position the user equipment. In another embodiment, the edge control plane entity receives user-plane data sent by the edge user plane entity. The edge control plane entity triggers the edge user plane entity to deliver paging. This specifically includes the following: A base station in a TA range that can be supported by the edge control plane entity is used to send a paging message. In this way, the edge control plane entity may send the paging message locally. When the user equipment moves between base stations served by the edge control plane entity, the edge control plane entity can learn of, by using the paging message, a base station to which the user equipment moves, thereby implementing more accurate positioning and control.

Figure 7:
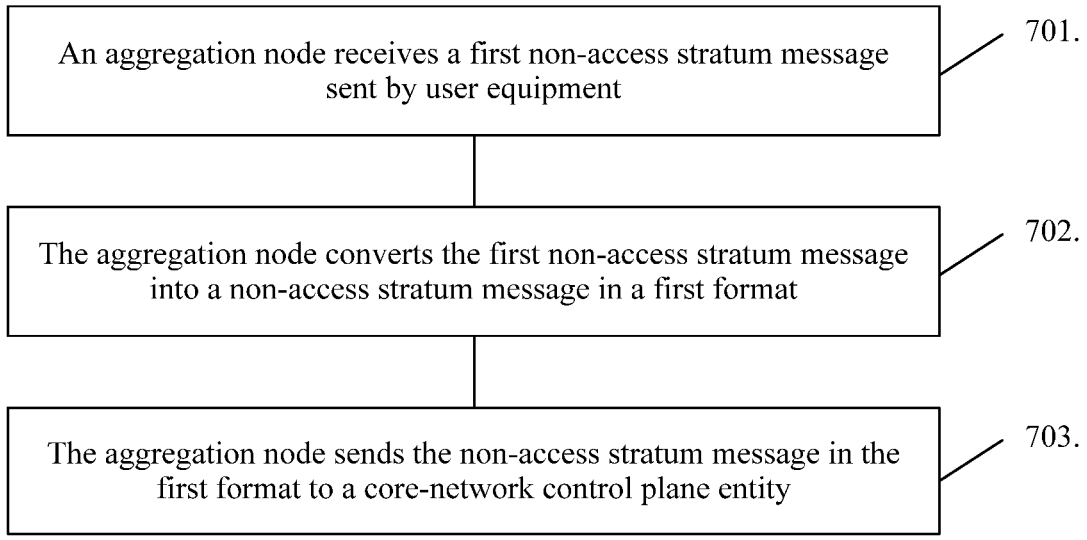
FIG. 7 is a schematic flowchart of a message transmission method according to an embodiment of the present invention.

FIG. 7 is a flowchart of still another method according to an embodiment of the present invention. As shown in FIG. 7, a specific procedure of the method includes the following steps.

Step 701: An aggregation node receives a first non-access stratum message sent by user equipment.

The first non-access stratum message corresponds to one RAT type, for example, 2G, 3G, 4G, 5G, or Wi-Fi. As a network continuously evolves, a RAT may be of another type or form. In an embodiment, an air interface exits between the aggregation node and the user equipment, and the air interface is used to receive the first non-access stratum message.

Step 702: The aggregation node converts the first non-access stratum message into a non-access stratum message in a first format based on a RAT type of the first non-access stratum message.

It should be understood that, during specific implementation, in a specific time period, a specific link, or a specific implementation process, there may be one or more first non-access stratum entities. The following separately describes a case in which there is one first non-access stratum entity and a case in which there are a plurality of first non-access stratum entities.

In another embodiment, step 701 may be specifically as follows: the aggregation node receives at least two non-access stratum messages sent by the user equipment. The at least two non-access stratum messages have different RAT types.

Step 703: The aggregation node sends the non-access stratum message in the first format to a core-network control plane entity.

In embodiment 702, the aggregation node converts the plurality of first non-access stratum messages into non-access stratum messages in the first format. In step 701, the aggregation node receives four first non-access stratum messages: A, B, C, and D. A and B are non-access stratum messages whose RAT types are 3G, C is a non-access stratum message whose RAT type is 4G, and D is a non-access stratum message whose RAT type is 5G. When A, B, C, and D are non-access stratum messages of a same type, refer to the case above in which there is one non-access stratum message. In step 702, if the aggregation node determines that the first format is a transmission format whose RAT type is 5G, the aggregation node converts A and B into non-access stratum messages whose RAT types are 5G, the aggregation node converts C into a non-access stratum message whose RAT type is 5G, and the aggregation node determines that the RAT type of D is already 5G and that D may not be converted. Still using the foregoing four non-access stratum messages A, B, C, and D as an example, when the aggregation node determines that the first format is another uniform format and the format is not a 3G, 4G, or 5G transmission format, the aggregation node may decode A, B, C, and D based on the RAT types; convert A, B, C, and D into the first format that is different from the RAT types of the received non-access stratum messages; and perform step 703.

It should be understood that, in step 701, a specific receiving manner of the user equipment is not limited when the aggregation node receives the first non-access stratum message sent by the user equipment UE, provided that the first non-access stratum message can be received. When there are a plurality of first non-access stratum messages, the first non-access stratum messages may be received in different manners. For example, one interface directly receives the plurality of first non-access stratum messages, or a plurality of interfaces receive the plurality of first non-access stratum messages. In an embodiment, the aggregation node includes at least two types of interfaces, and each type of interface is used to receive a first non-access stratum message of one RAT type. In another embodiment, the aggregation node includes one interface, and the one interface can support receiving first non-access stratum messages of at least two RAT types.

In the foregoing embodiment, after the aggregation node receives the at least two non-access stratum messages of different RAT types, the aggregation node converts the first non-access stratum messages into the non-access stratum messages in the first format based on the respective RAT types of the at least two first non-access stratum messages. In a process of processing first non-access stratum messages of a plurality of RAT types, the aggregation node converts the different first non-access stratum messages into non-access stratum messages of a first type. An interface of the aggregation node and an interface of the core network are unified, so that the interface of the aggregation node and the interface of the core network no longer need to support receiving and sending of non-access stratum messages of a plurality of RAT types, thereby further reducing deployment complexity, saving computing resources of a core network device, and improving overall network efficiency.

Figure 8:
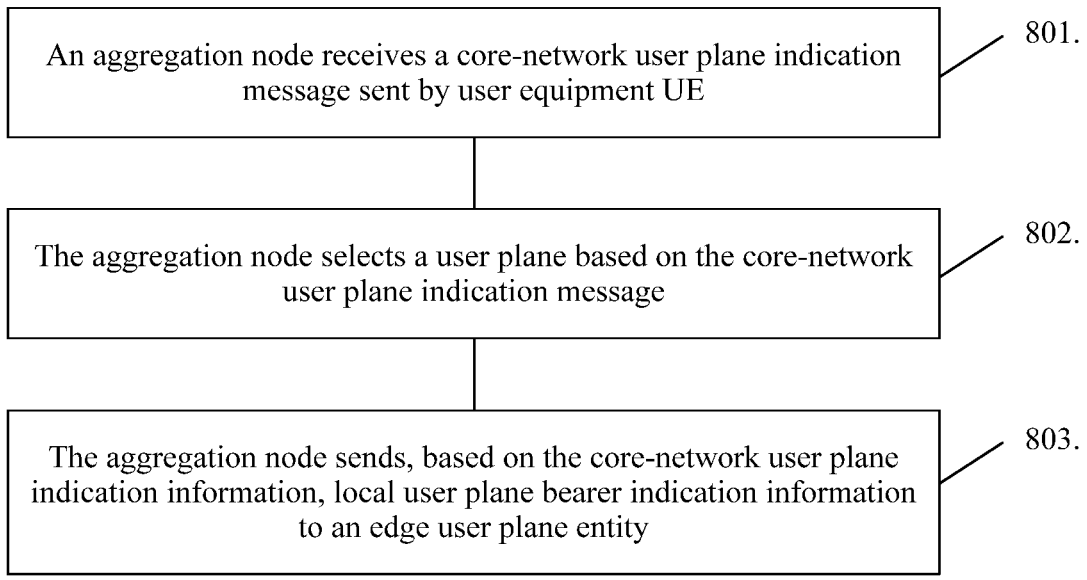
FIG. 8 is a schematic flowchart of a message transmission method according to an embodiment of the present invention.

FIG. 8 further shows still another embodiment of the present invention. FIG. 8 may be implemented independently as an embodiment, or may be implemented in combination with the embodiment in FIG. 7.

Step 801: An aggregation node receives a core-network user plane indication message sent by user equipment UE.

Step 802: The aggregation node selects a user plane based on the core-network user plane indication message, where that the aggregation node selects a user plane based on the core-network user plane indication message includes: setting up a user plane bearer based on the core-network user plane indication information, where the user plane bearer includes a local user plane bearer and/or a remote user plane bearer, and the local user plane bearer and the remote user plane bearer are used to transmit data.

In an embodiment, when the user plane bearer to be set up by the aggregation node is a local user plane bearer, step 803 is further included: The aggregation node sends, based on the core-network user plane indication information, local user plane bearer indication information to an edge user plane entity, to further set up the local user plane bearer.

The local user plane bearer can be set up by using the aggregation node. After the local user plane bearer is set up, different user equipments controlled by the aggregation node can perform communication locally. A length of a path for exchanging data by the user equipments is less than a length of a path for exchanging data through a core network. In a massive machine type communication scenario, communication between local machines may be set up directly by using the local user plane bearer. As a quantity of such user equipments keeps increasing, setup of the local user plane bearer can greatly reduce conventional processing and computing load of the core network and reduce a latency.

In another embodiment, when the user plane bearer to be set up by the aggregation node is a core-network user plane bearer, step 802 further includes step 804: The aggregation node sets up a core-network user plane bearer on a core-network user plane entity based on the user plane indication information. Details are as follows.

Step 805: The aggregation node sends an initial access request message to a core-network control plane entity.

Step 806: The aggregation node receives an initial access response message sent by the core-network control plane entity, where the initial access response message includes core-network user plane keeping information and quality of service QoS information of the user equipment.

Step 807: The aggregation node keeps the bearer between the aggregation node and the core-network user plane based on the core-network user plane keeping information and the QoS information of the user equipment.

The aggregation node may further be used to position the user equipment. In another embodiment, the aggregation node receives user-plane data sent by the edge user plane entity. The aggregation node triggers paging based on the user-plane data. Specifically, the aggregation node sends a paging message by using a base station in a TA range that can be supported by the aggregation node. In this way, the aggregation node may send the paging message locally. When the user equipment moves between base stations served by the aggregation node, the aggregation node can learn of, by using the paging message, a base station to which the user equipment moves, thereby implementing more accurate positioning and control. It should be understood that the edge user plane entity herein may be a local user-plane node.

Figure 9:
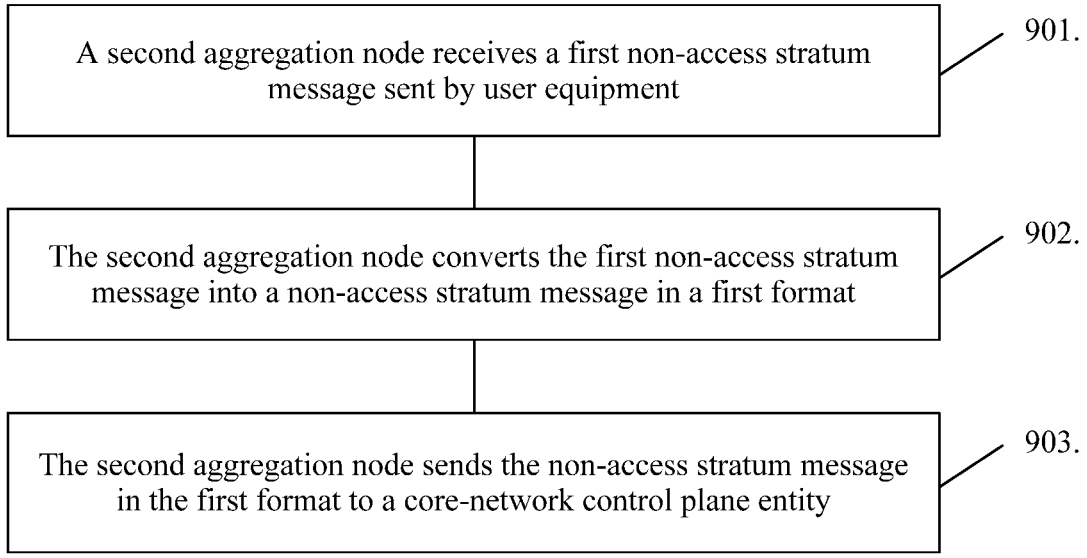
FIG. 9 is a schematic flowchart of a message transmission method according to an embodiment of the present invention.

FIG. 9 is a flowchart of still another method according to an embodiment of the present invention. As shown in FIG. 9, a specific procedure of the method includes the following steps.

Step 901: A second aggregation node receives a first non-access stratum message sent by a base station.

Step 902: The second aggregation node converts the first non-access stratum message into a non-access stratum message in a first format based on a RAT type of the first non-access stratum message.

Step 903: The aggregation node sends the non-access stratum message in the first format to a core-network control plane entity.

The second aggregation node may receive the first non-access stratum message in a plurality of manners. Related descriptions are provided in the receiving manners in the foregoing embodiments. Details are not described herein again. By using the method in this embodiment, an interface of the second aggregation node and an interface of a core network no longer need to support receiving and sending of non-access stratum messages of a plurality of RAT types, thereby further reducing deployment complexity, saving computing resources of a core network device, and improving overall network efficiency.

Figure 10:
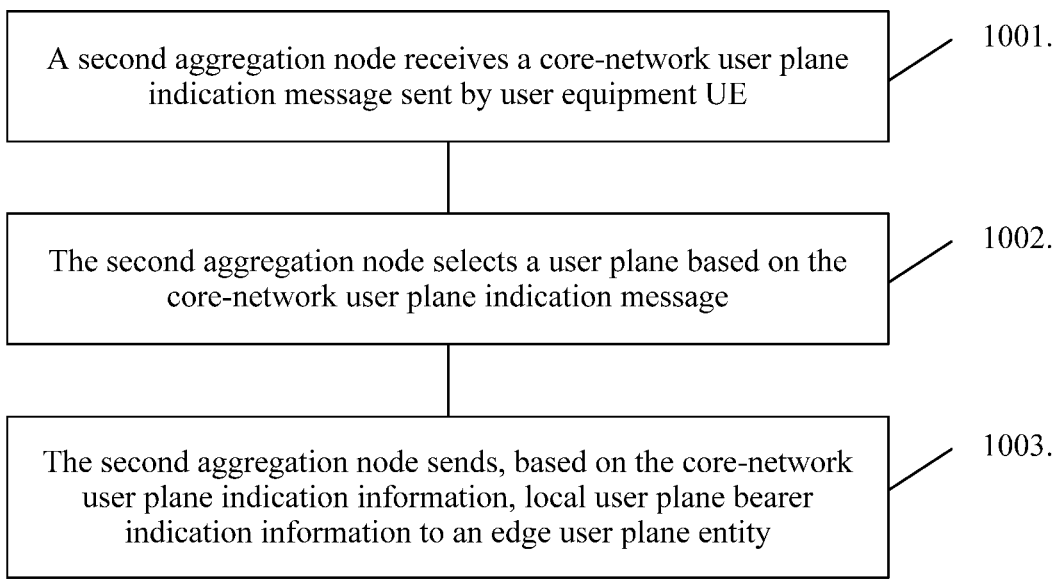
FIG. 10 is a schematic flowchart of a message transmission method according to an embodiment of the present invention.

FIG. 10 further shows still another embodiment of the present invention. FIG. 10 may be implemented independently as an embodiment, or may be implemented in combination with the embodiment in FIG. 9.

Step 1001: A second aggregation node receives a core-network user plane indication message sent by user equipment UE.

Step 1002: The second aggregation node selects a user plane based on the core-network user plane indication message, where that the second aggregation node selects a user plane based on the core-network user plane indication message includes: setting up a user plane bearer based on the core-network user plane indication information, where the user plane bearer includes a local user plane bearer and/or a remote user plane bearer, and the local user plane bearer and the remote user plane bearer are used to transmit data.

In an embodiment, when the user plane bearer to be set up by the second aggregation node is a local user plane bearer, step 1003 is further included: The second aggregation node sends, based on the core-network user plane indication information, local user plane bearer indication information to an edge user plane entity, to further set up the local user plane bearer.

The local user plane bearer can be set up by using the second aggregation node. After the local user plane bearer is set up, different user equipments controlled by the second aggregation node can perform communication locally. A length of a path for exchanging data by the user equipments is less than a length of a path for exchanging data through a core network. In a massive machine type communication scenario, communication between local machines may be set up directly by using the local user plane bearer. As a quantity of such user equipments keeps increasing, setup of the local user plane bearer can greatly reduce conventional processing and computing load of the core network and reduce a latency.

In another embodiment, when the user plane bearer to be set up by the second aggregation node is a core-network user plane bearer, step 1002 further includes step 1004: The second aggregation node sets up a core-network user plane bearer on a core-network user plane entity based on the user plane indication information. Details are as follows.

Step 1005: The second aggregation node sends an initial access request message to a core-network control plane entity.

Step 1006: The second aggregation node receives an initial access response message sent by the core-network control plane entity, where the initial access response message includes core-network user plane keeping information and QoS information of the user equipment, and the edge user plane entity keeps an RRC connection to the user equipment based on the core-network user plane keeping information and the QoS information of the user equipment. In an embodiment, the edge user plane entity is integrated into the second aggregation node.

Step 1007: The second aggregation node keeps the bearer between the second aggregation node and the core-network user plane based on the core-network user plane keeping information and the QoS information of the user equipment.

The second aggregation node may further be used to position the user equipment. In another embodiment, the second aggregation node receives user-plane data sent by the edge user plane entity. The second aggregation node triggers the edge user plane entity to deliver paging. This specifically includes the following: A base station in a TA range that can be supported by the second aggregation node is used to send a paging message. In this way, the second aggregation node may send the paging message locally. When the user equipment moves between base stations served by the second aggregation node, the second aggregation node can learn of, by using the paging message, a base station to which the user equipment moves, thereby implementing more accurate positioning and control. It should be understood that step 1005 to step 1007 may be performed independently.

Figure 11:
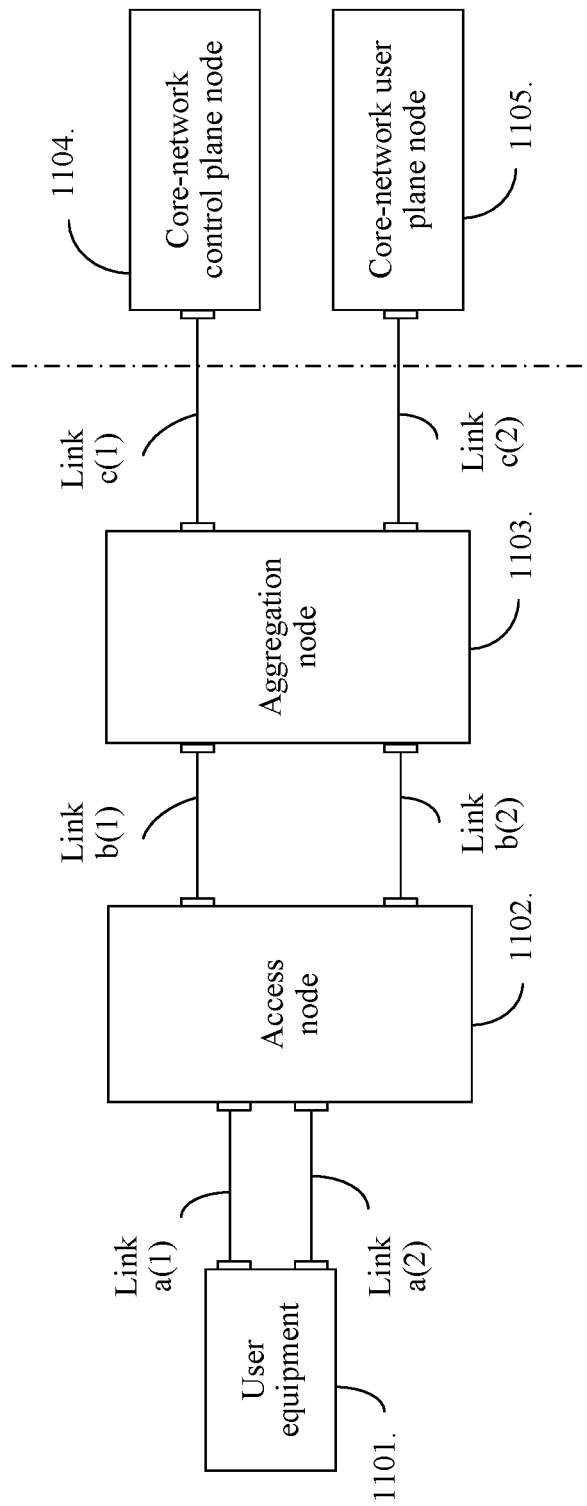
FIG. 11 is a schematic diagram of a possible architecture, links, and interfaces according to an embodiment of the present invention.

To describe the technical solutions of the embodiments of the present invention more clearly, the following describes, from a perspective of an overall solution with reference to FIG. 11, a service scenario and a system architecture that may be applied to the embodiments of the present invention.

In FIG. 11, the architecture includes user equipment 1101, an access node 1102, an aggregation node 1103, a core-network control plane node 1104, and a core-network user plane node 1105.

Two links are included between the user equipment 1101 and the access node 1102: a link a(1) and a link a(2). The link a(1) is between an air interface of the user equipment 1101 and an air interface of the access node 1102 and is obtained through configuration or negotiation, to implement interconnection and interworking. The link a(2) is between an air interface of the user equipment 1101 and an air interface of the access node 1102 and is obtained through configuration or negotiation, to implement interconnection and interworking. The link a(1) supports the user equipment in sending a non-access stratum message of a first RAT type, and the link a(2) supports the user equipment in sending a non-access stratum message of a second RAT type. In an embodiment, the link a(1) and the link a(2) are links between the access node and two user equipments, respectively, where one user equipment at least supports sending the non-access stratum message of the first RAT type, and the other user equipment at least supports sending the non-access stratum message of the second RAT type.

Two links are included between the access node 1102 and the aggregation node 1103: a link b(1) and a link b(2). The link b(1) is between a first interface of the access node 1102 and a first interface of the aggregation node 1103 and is obtained through configuration or negotiation, to implement interconnection and interworking. The link b(2) is between a second interface of the access node 1102 and a second interface of the aggregation node 1103 and is obtained through configuration or negotiation, to implement interconnection and interworking. The link b(1) supports the access node 1102 in sending the non-access stratum message of the first RAT type, and the link b(2) supports the user equipment in sending the non-access stratum message of the second RAT type.

A link c(1) is between a third interface of the aggregation node 1103 and a third interface of the core-network control plane node 1104 and is obtained through configuration or negotiation, to implement interconnection and interworking. A link c(2) is between a fourth interface of the aggregation node 1103 and a fourth interface of the core-network user plane node 1105 and is obtained through configuration or negotiation, to implement interconnection and interworking. The link c(1) supports the aggregation node 1103 in sending a non-access stratum message to the core-network control plane node 1104, and the link c(2) supports the aggregation node 1103 in sending an access stratum message to the core-network data plane node 1105. It should be understood that, in different core network structures, a link between the aggregation node and a core network may include only one of the link c(1) and the link c(2), or may include a plurality of links c(1) and a plurality of links c(2). In an embodiment, the link c(1) and the link c(2) are NAS conversion interfaces, or the link c(1) and the link c(2) may be new interfaces.

The aggregation node 1103 has an interface conversion function. The aggregation node may convert, into non-access stratum messages in a first format, a non-access stratum message of the first RAT type received by using the first interface and a non-access stratum message of the second RAT type received by using the second interface, where the non-access stratum messages in the first format are non-access stratum messages supported by the link c(1) and the link c(2). The aggregation node 1103 may further send the non-access stratum message in the first format to the core-network control plane node 1104 by using the third interface, and/or the aggregation node 1103 may further send the non-access stratum message in the first format to the core-network user plane node by using the fourth interface. In this way, the core network no longer needs to obtain, by parsing the non-access stratum message obtained through conversion, the RAT type of the non-access stratum message, thereby saving computing resources of the core network and improving overall network efficiency.

The access node may be one base station or a plurality of base stations. In an embodiment, the access node 1102 forwards the non-access stratum message of the first RAT type sent by using the link a(1), and the access node 1102 forwards the non-access stratum message of the second RAT type sent by using the link a(2). This may be specifically a transparent transmission process. The aggregation node 1103 receives, by using the first interface, the non-access stratum message of the first RAT type sent by using the link a(1).

In the architecture shown in FIG. 11, the aggregation node 1103 sends an initial access request message to the core-network control plane node 1104. The aggregation node 1103 receives an initial access response message sent by the core-network control plane node 1104, where the initial access response message includes core-network user plane keeping information and QoS information of the user equipment. The aggregation node keeps the bearer between the aggregation node and a core-network user plane based on the core-network user plane keeping information and the QoS information of the user equipment.

In the architecture shown in FIG. 11, the aggregation node may further be used to position the user equipment. In another embodiment, the aggregation node receives user-plane data sent by an edge user plane entity. The aggregation node triggers paging based on the user-plane data. This specifically includes the following: A base station in a TA range that can be supported by the aggregation node is used to send a paging message. In this way, the aggregation node may send the paging message locally. When the user equipment moves between base stations served by the aggregation node, the aggregation node can learn of, by using the paging message, a base station to which the user equipment moves, thereby implementing more accurate positioning and control.

In another embodiment, the aggregation node 1103 may further keep an RRC connection to the user equipment based on the core-network user plane keeping information and the QoS information of the user equipment.

Figure 12:
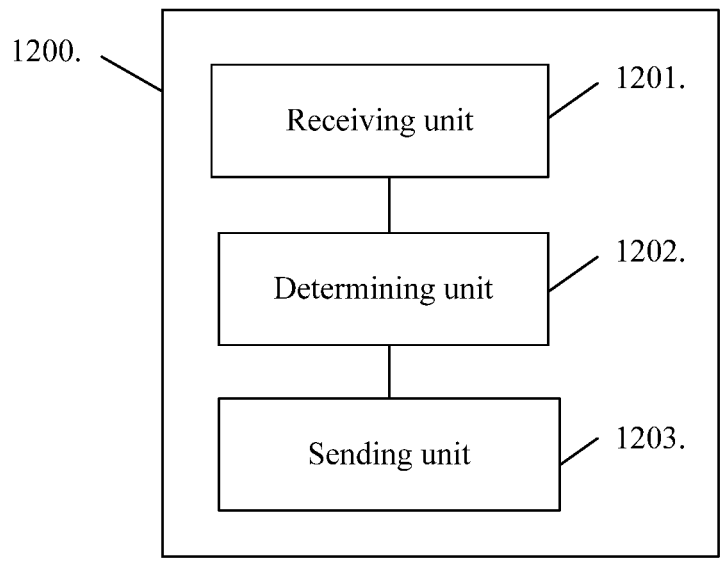
FIG. 12 is a schematic structural diagram of an aggregation node according to an embodiment of the present invention.

FIG. 12 is a schematic structural diagram of an aggregation node apparatus according to an embodiment of the present invention. As shown in FIG. 12, the aggregation node apparatus 1200 includes:

a receiving unit 1201, a determining unit 1202, and a sending unit 1203. The apparatus is capable of implementing various functions in the embodiments in FIG. 5, FIG. 6, FIG. 7, FIG. 8, FIG. 9, and FIG. 10. For example, the receiving unit 1201 is configured to receive a first non-access stratum message sent by user equipment UE; the determining unit 1202 is configured to convert the first non-access stratum message into a non-access stratum message in a first format based on a RAT type of the first non-access stratum message; and the sending unit 1203 is configured to send the non-access stratum message in the first format to a core-network control plane entity. In another example, the receiving unit 1201 may further be configured to receive a core-network user plane indication message sent by the user equipment UE. The determining unit 1202 is further configured to select a user plane based on the core-network user plane indication message. When the determining unit 1202 determines that a user plane bearer to be set up by an edge control plane entity is a local user plane bearer, the sending unit 1203 may further be configured to send local user plane bearer indication information to an edge user plane entity based on the core-network user plane indication information, to further set up the local user plane bearer. When the aggregation node apparatus 1200 integrates a function of the edge user plane entity, the determining unit 1202 can set up the local user plane bearer directly. When a user plane bearer to be set up by the determining unit 1202 is a core-network user plane bearer, the sending unit 1203 is configured to send an initial access request message to the core-network control plane entity, and the receiving unit 1201 receives an initial access response message sent by the core-network control plane entity. The determining unit 1202 keeps the bearer between the aggregation node and the core-network user plane based on core-network user plane keeping information and QoS information of the user equipment.

It should be understood that the units may be combined with each other or be replaced or split within a proper range. The unit division in the embodiments of the present invention is an example, and is merely logical function division. There may be another division manner in actual implementation. Functional units in the embodiments of the present invention may be integrated into one processing unit, or each of the units may exist alone physically, or two or more units may be integrated into one unit. For example, if the receiving unit 1201 receives non-access stratum messages of a plurality of different RAT types, the non-access stratum messages may be received by using different interface units included in the receiving unit 1201. For example, the receiving unit 1201 includes a plurality of types of interface units, and each type of interface unit receives a non-access stratum message of a different RAT type. Alternatively, the receiving unit 1201 directly receives non-access stratum messages of different types, and the processing unit processes the received non-access stratum messages of different types. For example, a plurality of types of interface processing units included in the processing unit performs processing and a subsequent conversion function. In addition, the receiving unit and the sending unit may also be combined into one unit, to process exchange of external data.

Figure 13:
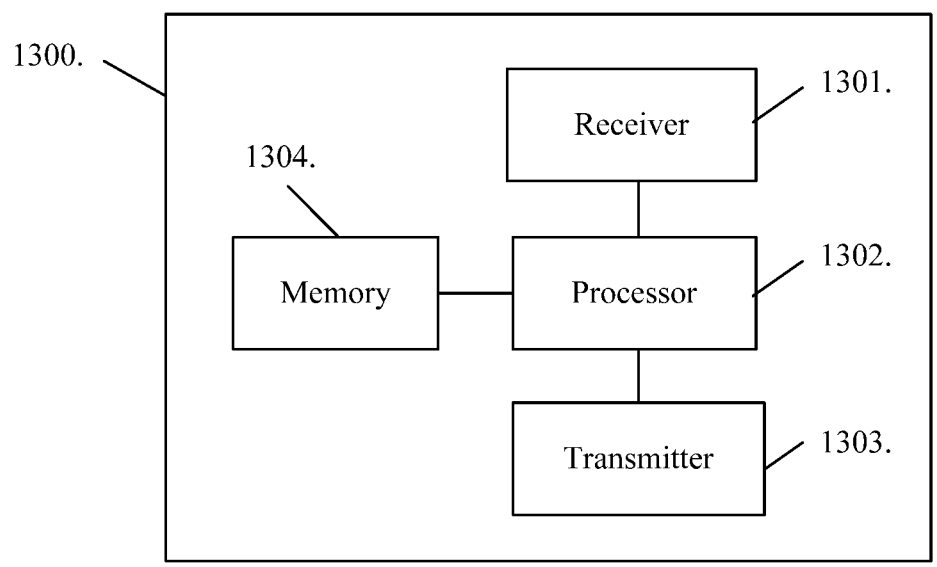
FIG. 13 is a schematic structural diagram of an aggregation node according to an embodiment of the present invention.

FIG. 13 is a structural diagram of an aggregation node apparatus according to an embodiment of the present invention. As shown in FIG. 13, the aggregation node apparatus 1300 includes a receiver 1301, a processor 1302, a transmitter 1303, and a memory 1304.

The receiver 1301 is configured to implement a function of the receiving unit in FIG. 12, the transmitter 1303 is configured to implement a function of the sending unit in FIG. 12, and the processor 1302 is configured to implement a function of the determining unit in FIG. 12. The memory 1304 is configured to store computing data, an initialization program, and the like. The receiver 1301 and the transmitter 1303 may be a same apparatus that is configured to send and receive data. The aggregation node apparatus 1300 may be a set of system or a part of a system, and is used to implement the deployment in FIG. 2, FIG. 3, FIG. 4, or FIG. 11. For example, during deployment, the aggregation node may include a backplane. The backplane is connected to one or more pieces of control board hardware, to manage each piece of processing board hardware. The backplane includes one or more pieces of processing board hardware. The processing board hardware includes the apparatuses shown in FIG. 13. Receiving or sending of the receiver and the transmitter may be implemented by using a plurality of full duplex physical interfaces, or may be implemented by using a plurality of simplex or half-duplex interfaces. The interfaces each may be a combination of a plurality of segments of interfaces. The processor may be a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processor may implement or execute various example logical blocks, modules, and circuits described with reference to content disclosed in the present invention. Alternatively, the processor may be a combination of processors implementing a computing function, for example, a combination of one or more microprocessors, or a combination of a DSP and a microprocessor. It should be understood that, as an information volume increases, the processor may also be split into a plurality of types, and the plurality of types of processors are mutually coordinated, to implement a function of the present invention. For example, converting, by the processor, a first non-access stratum message into a non-access stratum message in a first format based on a RAT type of the first non-access stratum message may be implemented by using a central processing unit; and selection of a user plane based on a core-network user plane indication message may be implemented by using a high-performance FPGA. In this way, a packet parsing advantage of the central processing unit and a forwarding advantage of the high-performance FPGA can be used, to improve efficiency. It should be understood that along with the development of various types of processors, advantages and functions of the processors may also be different. A person skilled in the art can make a change based on actual application.

Method or algorithm steps described in combination with the content disclosed in the present invention may be implemented by hardware, or may be implemented by a processor by executing a software instruction. The software instruction may include a corresponding software module. The software module may be stored in a random access memory (Random Access Memory, RAM), a flash memory, a read only memory (Read Only Memory, ROM), an erasable programmable read only memory (Erasable Programmable ROM, EPROM), an electrically erasable programmable read only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made on a basis of the technical solutions of the present invention shall fall within the protection scope of the present invention. The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data processing method comprising:
    receiving, by an edge control plane entity, first non-access stratum messages of different radio access technology (RAT) types having different standards sent by user equipment (UE);
    converting, by the edge control plane entity, the first non-access stratum messages into respective non-access stratum messages in a first format based on the RAT type of a corresponding first non-access stratum message, wherein the first format is a non-access stratum message transmission format supported between an aggregation node and a core-network control plane entity; and
    sending, by the edge control plane entity, the non-access stratum messages in the first format to the core-network control plane entity.

2. The method according to claim 1, wherein the converting, by the edge control plane entity, the first non-access stratum messages into the respective non-access stratum messages in a first format comprises:
    decoding, by the edge control plane entity, the first non-access stratum messages; and
    converting, by the edge control plane entity, the first non-access stratum messages into the respective non-access stratum message in a first format.

3. The method according to claim 1, wherein the method further comprises:
    receiving, by the edge control plane entity, a core-network user plane indication message sent by the user equipment (UE); and
    selecting, by the edge control plane entity, a user plane based on the core-network user plane indication message.

4. The method according to claim 3, wherein the selecting, by the edge control plane entity, a user plane based on the core-network user plane indication message further comprises:
    setting up, by the edge control plane entity, a user plane bearer based on the core-network user plane indication information, where the user plane bearer includes a local user plane bearer and/or a remote user plane bearer, and the local user plane bearer and the remote user plane bearer are used to transmit data.

5. The method according to claim 4, wherein the method further comprises:
    sending, by the edge control plane entity, based on the core-network user plane indication information, local user plane bearer indication information to an edge user plane entity, to further set up the local user plane bearer.

6. The method according to claim 3, wherein when the user plane bearer to be set up by the edge control plane entity is a core-network user plane bearer, the method further comprises:
    setting up, by the edge control plane entity, a core-network user plane bearer on a core-network user plane entity based on the user plane indication information.

7. The method according to claim 6, wherein the setting up, by the edge control plane entity, a core-network user plane bearer on a core-network user plane entity comprises:
    sending, by the edge control plane entity, an initial access request message to a core-network control plane entity;
    receiving, by the edge control plane entity, an initial access response message sent by the core-network control plane entity, where the initial access response message includes core-network user plane keeping information and QoS information of the user equipment; and
    keeping, by the edge control plane entity, the bearer between the aggregation node and the core-network user plane based on the core-network user plane keeping information and the QoS information of the user equipment.

8. A communication device comprising:
    a receiver configured to receive first non-access stratum messages of different radio access technology (RAT) types having different standards sent by user equipment (UE);
    a processor configured to convert the first non-access stratum messages into respective non-access stratum messages in a first format based on the RAT type of a corresponding first non-access stratum message, wherein the first format is a non-access stratum message transmission format supported between an aggregation node and a core-network control plane entity; and
    a transmitter configured to send the non-access stratum message in the first format to the core-network control plane entity.

9. The device according to claim 8, wherein
    the processor is further configured to decode the first non-access stratum messages; and
    the processor is further configured to convert the first non-access stratum messages into the respective non-access stratum messages in a first format.

10. The device according to claim 8, wherein
    the receiver is further configured to receive a core-network user plane indication message sent by user equipment (UE); and
    the processor is further configured to select a user plane based on the core-network user plane indication message.

11. The device according to claim 10, wherein
    the processor is further configured to set up a user plane bearer based on the core-network user plane indication information, where the user plane bearer includes a local user plane bearer and/or a remote user plane bearer, and the local user plane bearer and the remote user plane bearer are used to transmit data.

12. The device according to claim 11, wherein the transmitter is further configured to send, based on the core-network user plane indication information, local user plane bearer indication information to an edge user plane entity, to further set up the local user plane bearer.

13. The device according to claim 10, wherein the processor is further configured to set up a core-network user plane bearer on a core-network user plane entity based on the user plane indication information.

14. The device according to claim 13, wherein the transmitter is further configured to transmit an initial access request message to a core-network control plane entity;

the receiver is further configured to receive an initial access response message sent by the core-network control plane entity, where the initial access response message includes core-network user plane keeping information and QoS information of the user equipment; and the processor is further configured to keep the bearer between the aggregation node and the core-network user plane based on the core-network user plane keeping information and the QoS information of the user equipment.

15. A non-transitory computer readable medium, comprising one or more instructions, which when executed by a computer, cause the computer to carry out the method according to claim 1.

* * * * *